United States Patent
Amrany et al.

(10) Patent No.: US 6,266,347 B1
(45) Date of Patent: Jul. 24, 2001

(54) SYSTEM AND METHOD FOR MODIFYING SYMBOL DURATION FOR THE EFFICIENT TRANSMISSION OF INFORMATION IN A TIME DUPLEX NOISE ENVIRONMENT

(75) Inventors: Daniel Amrany, Ocean Township; Jean-Francois Lopez, Eatontown; Laurent Alloin, Long Branch, all of NJ (US)

(73) Assignee: Globespan, Inc., Red Bank, NJ (US)

( * ) Notice: Subject to any disclaimer, the term of this patent is extended or adjusted under 35 U.S.C. 154(b) by 0 days.

(21) Appl. No.: 09/456,451

(22) Filed: Dec. 8, 1999

Related U.S. Application Data (60) Provisional application No. 60/111,512, filed on Dec. 8, 1998.

(51) Int. Cl.[7] ................................... H04J 4/00
(52) U.S. Cl. ............ 370/478; 375/220; 375/222; 379/93.01; 370/286
(58) Field of Search ................ 370/498, 503, 370/509, 478, 201, 276, 286; 375/219, 260, 285, 222, 220, 254; 379/93.01, 93.05, 93.06, 93.07

(56) References Cited

U.S. PATENT DOCUMENTS

| | | |
|---|---|---|
| 5,519,731 | 5/1996 | Cioffi . |
| 5,668,802 | 9/1997 | Chalmers et al. . |
| 5,673,290 | 9/1997 | Cioffi . |
| 5,680,394 | 10/1997 | Bingham et al. . |
| 5,757,803 | 5/1998 | Russell et al. . |
| 5,838,667 | 11/1998 | Bingham et al. . |
| 5,991,311 | * 11/1999 | Long et al. ................. 370/524 |
| 6,069,922 | * 5/2000 | Dyke ............................ 375/285 |
| 6,097,763 | * 8/2000 | Djokovic et al. ............. 375/260 |

* cited by examiner

*Primary Examiner*—Ajit Patel
*Assistant Examiner*—Bob A. Phunkulh
(74) *Attorney, Agent, or Firm*—Thomas, Kayden, Horstemeyer & Risley (57) ABSTRACT

A system and method for modifying symbol duration for the efficient transmission of information in a time duplex noise environment is disclosed. In a simplified embodiment, the system modifies the length of Discrete MultiTone (DMT) symbols, thereby providing a system wherein a first half of the DMT symbols are transmitted entirely during a period in which there is far end crosstalk (FEXT) noise, and a second half of the DMT symbols are transmitted entirely during a period in which there is near end crosstalk (NEXT) noise. Preferably, the duration of each DMT symbol is selected to be 0.25 ms such that exactly ten DMT symbols fall within a time duplex period of 2.5 ms. As such, during a FEXT period, exactly five DMT symbols are transmitted, and during a NEXT period, exactly five DMT symbols are transmitted. Therefore, in each TTR period, an additional DMT symbol, with modified length, is transmitted during the FEXT period, during which information is transmitted at a high bit rate.

20 Claims, 6 Drawing Sheets

SYSTEM AND METHOD FOR MODIFYING SYMBOL DURATION FOR THE EFFICIENT TRANSMISSION OF INFORMATION IN A TIME DUPLEX NOISE ENVIRONMENT

CROSS REFERENCE TO RELATED APPLICATIONS

This application claims the benefit of U.S. provisional application Ser. No. 60/111,512 filed on Dec. 8, 1998 and entitled "Alternative Configurations for a DMT ADSL System Operating in a Time Duplex Noise Environment, Such as TCM-ISDN Interferers," which is incorporated by reference herein in its entirety.

FIELD OF THE INVENTION

The present invention relates generally to broadband networks, and more particularly to the configuration of a DMT xDSL system that adapts symbol duration in order to improve the transmission of information in a time-duplex noise environment.

BACKGROUND OF THE INVENTION

Asymmetric digital subscriber line (ADSL) technology has been introduced into the field of broadband networking, among other reasons, to overcome issues faced by traditional voice band technology. Such issues include, but are not limited to, bandwidth limitations. ADSL technology utilizes the infrastructure already in place in a public switched telephone network (PSTN), including copper loops, constructed of copper wires, between a customer premise and a central office. Advantageously, ADSL technology does not require replacement of network equipment such as routers, switches, firewalls and web servers, which are commonly used in today's paradigm for broadband access.

Unfortunately, in a telephone network, while electrical energy is transmitted across copper wires, a modulated signal also radiates energy onto adjacent copper wire loops that are located in the same cable bundle. This cross coupling of electromagnetic energy is referred to as crosstalk.

In a typical telephone network, multiple insulated copper wire pairs are bundled together into a cable called a cable binder. Adjacent systems within a cable binder that transmit or receive information in the same range of frequencies can create significant crosstalk interference. The crosstalk interference is attributed to crosstalk-induced signals combining with signals that were originally intended for transmission over the copper wire loop. The result is a slightly different shaped waveform than was originally transmitted, which is representative of data degradation.

Crosstalk can be categorized in one of two forms. Near end crosstalk, commonly referred to as NEXT, is the most significant because a high energy signal from an adjacent system can induce relatively significant crosstalk into the primary signal. In other words, NEXT essentially is a measure of the crosstalk noise that two devices used for communication purposes induce upon each other at the same end of the cable binder.

Another form of crosstalk is far end crosstalk, or FEXT. FEXT is typically measured by applying a test signal to a wire pair at one end of a channel and measuring the disturbance on other wire pairs at the far end. Therefore, FEXT essentially measures the crosstalk noise that communications equipment creates for devices it is communicating with at the opposite end of the wire pair used for data transmission. Typically, FEXT is less of an issue than NEXT since the far end interfering signal is attenuated as it traverses the copper wire loop.

In an environment, where Time Compressed Multiplex Integrated Service Digital Network (or TCM-ISDN) is deployed, the source of NEXT and FEXT noises are commonly referred to as TCM-ISDN interferers. The TCM-ISDN system performs alternatively upstream and downstream transmission of data during a period referred to as the TCM timing reference (TTR). In the first half of the TTR, an ISDN central office (ISDN-CO) transmits data to an ISDN remote terminal (ISDN-RT), while during the second half of the TTR period the ISDN-RW transmits data to the ISDN-CO. Consequently, an ADSL transceiver, connected to the wire loop via the CO end, receives NEXT noise from the ISDN-CO during the first half of the TTR, and FEXT noise from the ISDN-RT during the second half of the TTR. Conversely, an ADSL transceiver unit, connected to the wire loop via the ISDN-RT end, receives FEXT noise from the ISDN-CO during the first half of the TTR period, and NEXT noise from the ISDN-RT during the second half of the TTR period. The presence of ISDN NEXT and FEXT noises affects the performance of an ADSL system differently.

With the introduction of local loop use for both analog voice and digital data, Discrete MultiTone (DMT) line coding techniques were developed. DMT line coding techniques utilize multiple carriers that create sub-channels (i.e., 256 sub-channels for ADSL), wherein each sub-channel carries a portion of the total information for transmission. Each sub-channel is independently modulated, thereby accustoming DMT based ADSL modems to be considered multiple simultaneously running modems, operating in adjacent bands.

During initiation of an ADSL system which uses DMT line coding, DMT monitors line conditions and computes the bit carryino capacity of each sub-channel based upon the sub-channel's SNR. The system then accordingly assigns a number of bits to be carried by each sub-channel. If a sub-channel is experiencing external interference, such as, but not limited to, crosstalk a decision may be made either to exclude use of this sub-channel in favor of alternative sub-channels, or to vary its bit carrying capacity accordingly. Thus, DMT can dynamically adapt the bit rate to line conditions since each sub-channel carries a certain number of bits depending on its SNR, thereby automatically adjusting bit rate.

In a time duplex noise environmnent, such as, but not limited to, TCM-ISDN, an ADSL DMT system adapts its bit rate in accordance with the FEXT and NEXT noise levels. The overall rate of information transmission is dependent upon the number of DMT symbols transmitted, which, in turn, is affected differently by FEXT noise than by NEXT noise. Unfortunately, the number of symbols transmitted under the influence of NEXT noise is larger than the number of symbols affected by FEXT noise. Since typically NEXT noise is more powerful than FEXT noise, the overall bit rate of an ADSL system is essentially reduced due to a lower bit rate being used for the transmission of information during NEXT noise.

SUMMARY OF THE INVENTION

In light of the foregoing, the invention provides a configuration of a DMT xDSL system and a method for modifying DMT symbol duration for efficiently transmitting information within a time duplex noise environment.

Generally, the system modifies the length of all DMT symbols, thereby providing a system wherein a first half of the DMT symbols are transmitted entirely during a period in which there is FEXT noise and a second half of the DMT symbols are transmitted entirely during a period in which there is NEXT noise. Preferably, the duration of each DMT symbol is selected to be 0.25 ms such that exactly ten DMT symbols fall within a time duplex period of 2.5 ms. As such, during a FEXT period, exactly five DMT symbols are transmitted, and during a NEXT period, exactly five DMT symbols are transmitted. Therefore, in each TTR period, one additional DMT symbol, with modified length, is transmitted during the FEXT period, during which information is transmitted at a higher bit rate.

The invention has numerous advantages, a few of which are delineated hereafter as examples. Note that the embodiments of the invention, which are described herein, possess one or more, but not necessarily all, of the advantages set out hereafter.

One advantage of the invention is that it allows for an increase in the overall transmission rate of an xDSL system operating in a time duplex noise environment.

Another advantage is that it allows for a simplified swapping of bitmap profiles between symbols affected by FEXT and NEXT noise.

Another advantage is that the proposed system is capable of reconfiguring itself, from a standard default configuration, to a new configuration that is more appropriate for a time-duplex noise environment.

Other features and advantages of the present invention will become apparent to one of reasonable skill in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which, however, should not be taken to limit the invention to the specific embodiments, but are for explanation and for better understanding. Furthermore, the drawings are not necessarily to scale, emphasis instead being placed upon clearly illustrating the principles of the invention. Finally, like reference numerals in the figures designate corresponding parts throughout the several drawings.

DESCRIPTION OF THE PREFERRED EMBODIMENTS

Figure 1:
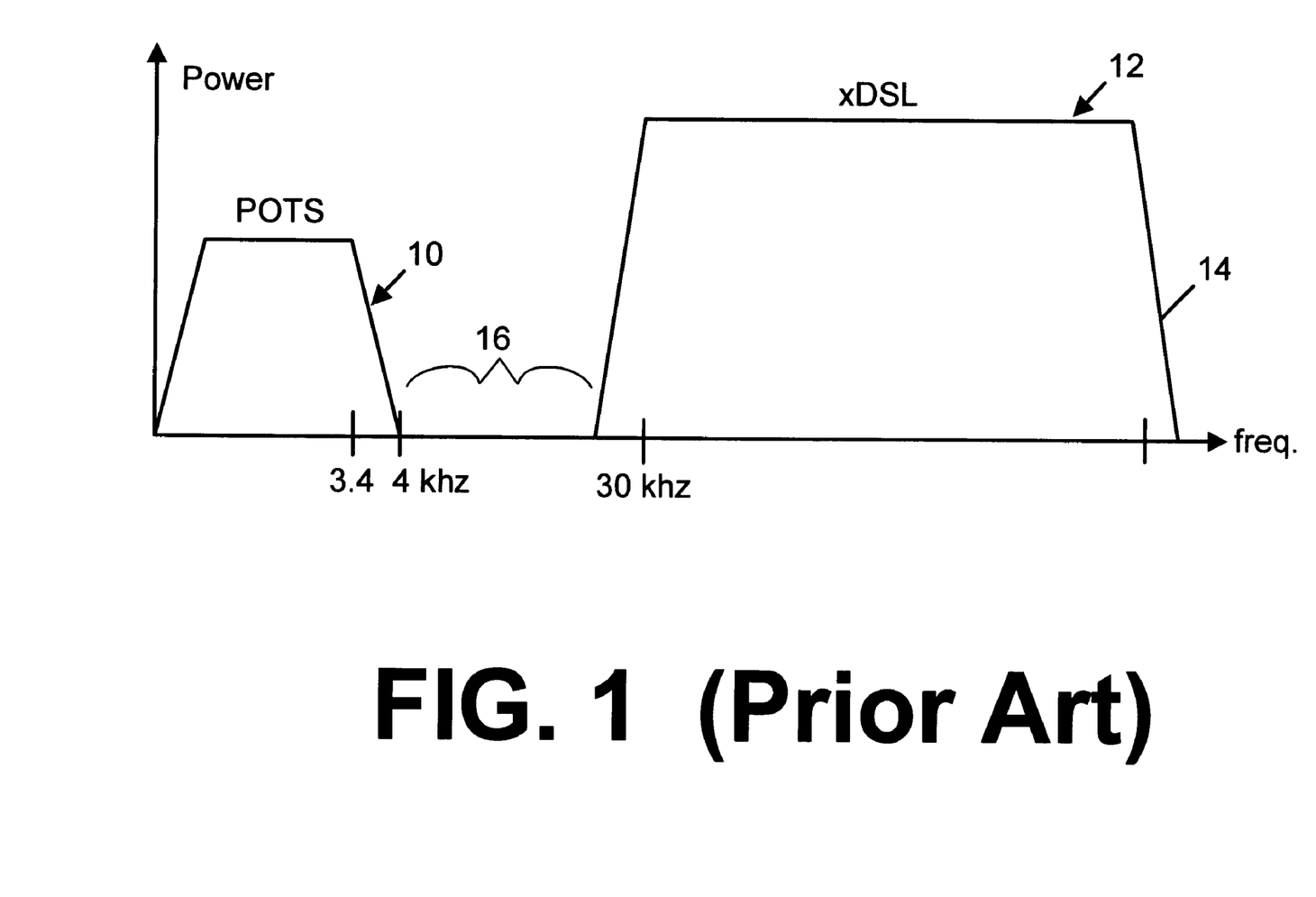
FIG. 1 is a graph illustrating the spectrum allocation for both POTS and xDSL signals.

Referring now to the drawings, wherein like reference numerals designate corresponding parts throughout the drawings FIG. 1 shows the spectrum allocation for both POTS and xDSL signals. Specifically, the graph is a plot of frequency on the horizontal axis and power on the vertical axis. As is known, the POTS frequency band 10 generally extends from approximately DC, or 0 hertz, to approximately 3.4 kilohertz. The xDSL frequency band 12 generally extends from approximately 30 kilohertz up to an upper boundary 14, which varies depending upon the particular digital subscriber line technology utilized. A separation or guard band 16 provides a margin of signal separation between the POTS frequency band and the xDSL frequency band, thereby allowing both POTS and xDSL to co-exist on the same wire.

Figure 2:
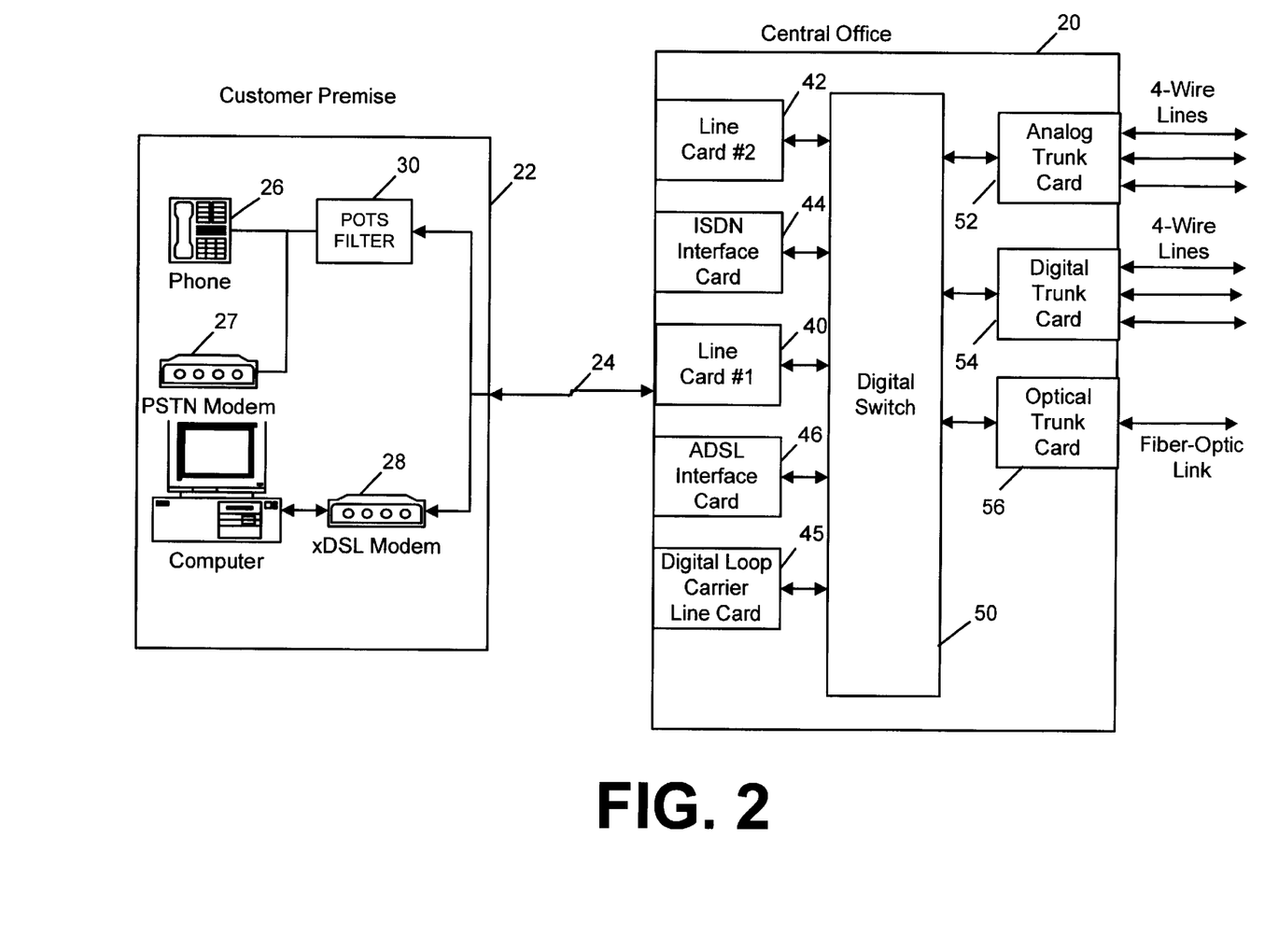
FIG. 2 is a block diagram of a communications system between a central office and a customer premise that may be used to implement the system of the preferred embodiment of the invention.

Referring now to FIG. 2, a communication system is shown which may be used to implement the system of the preferred embodiment of the invention. Specifically, FIG. 2 illustrates communication between a central office 20 and a customer premise 22 by way of a local loop 24. While the customer premise 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28. When an xDSL service is provided, such as, but not limited to, ADSL, a POTS filter 30 is interposed between the POTS equipment 26 and the local loop 24. As is known, the POTS filter 30 includes a low-pass filter having, a cut-off frequency of approximately 4 kilohertz to 10 kilohertz, in order to filter high frequency transmissions from the xDSL communication device 28 and protect the POTS equipment 26.

At the central office 20, additional circuitry is provided. Generally, a line card 40 containing line interface circuitry is provided for electrical connection to the local loop 24. In fact, multiple line cards may be provided 40, 42 to serve as a plurality of local loops 24. In the same way, additional circuit cards are typically provided at the central office 20 to handle different types of services. For example, an integrated services digital network (ISDN) interface card 44, a digital loop carrier line card 46, and other circuit cards, for supporting similar and other communication services, may be provided. Particular to the present ADSL system, an ADSL interface card 45 may also be provided at the central office 20 in order to handle ADSL services, as further demonstrated by FIG. 3.

A digital switch 50 is also provided at the central office 20 and is disposed for communication with each of the various line cards 40, 42, 44, 45, 46. On the outgoing side of the central office 20 (i.e., the side opposite the various local loops), a plurality of trunk cards 52, 54, 56 are typically provided. For example, an analog trunk card 52, a digital trunk card 54, and an optical trunk card 56 are all illustrated in FIG. 2. Typically, these cards have outgoing lines that support numerous multiplexed transmissions and are typically destined for other central offices or long distance toll offices.

Figure 3:
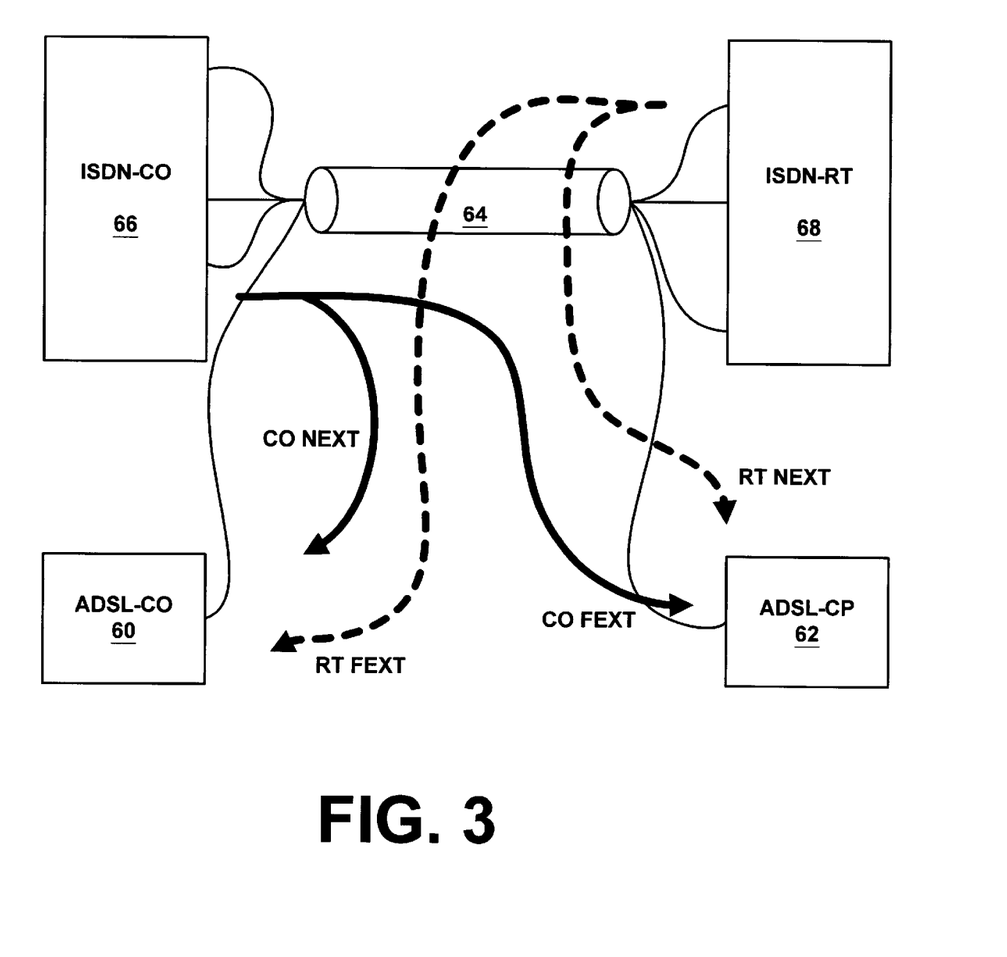
FIG. 3 is a block diagram illustrating the effects of crosstalk wherein a first ADSL transceiver is connected to a second ADSL transceiver via a cable bundle shared with existing TCM-ISDN links between an ISDN-CO and an ISDN-RT.

FIG. 3 illustrates the effects of crosstalk wherein a first ADSL transceiver (ADSL-CO) 60 is connected to a second ADSL, transceiver (ADSL-CP) 62 via a cable bundle 64 that is shared with existing TCM-ISDN links between an ISDN-CO 66 and an ISDN-RT 68. Typically, while an ISDN system will alternate the upstream and downstream transmission of information at a rate of 400 Hz, both, ADSL downstream transmission of information, between the ADSL-CO 60 and the ADSL-CP 62, and ADSL upstream transmission of information, between the ADSL-CP 62 and the ADSL-CO 60, occur simultaneously. In accordance with the preferred embodiment of the invention, a 2.5 ms TTR period, which relates to the 400 Hz rate, is defined by a clock-signal producing module located in the ISDN-CO. Alternatively, the clock-signal producing module may be located elsewhere within the ISDN system, or external to the ISDN system.

During the first half of a TTR period, as designated by the bold solid line, when information is transmitted from the ISDN-CO 66 to the ISDN-RT 68, the ADSL-CO 60 receives NEXT noise from the ISDN-CO 66, and the ADSL-CP 62 receives FEXT noise from the ISDN-CO 66. Accordingly, when considering ADSL downstream transmission between an ADSL-CO 60 and an ADSL-CP 62, the first half of the TTR period is also referred to as the FEXT period, since this is the period in which the ADSL-CP 62 receives FEXT noise.

During the second half of the TTR period as designated by the bold dotted line, when information is transmitted from the ISDN-RT 68 to the ISDN-CO 66, the ADSL-CP 62 receives NEXT noise from the ISDN-RT 68, and the ADSL-CO 60 receives FEXT noise from the ISDN-RT 68. Accordingly, when considering the ADSL downstream transmission of data between an ADSL-CO 60 and an ADSL-CP 62, the second half of the TTR period is also referred to as the NEXT period, since this is the period in which the ADSL CP 62 receives NEXT noise.

When considering the ADSL upstream transmission of data between an ADSL-CP 62 and an ADSL-CO 60, the NEXT and FEXT periods are switched. This switch is due to the ADSL-CO 60 receiving NEXT noise from the ISDN-CO 66 during the first half of the TTR period, while receiving FEXT noise from the ISDN-RT 68 during the second half of the TTR period.

It should be noted that while the present disclosure is made with reference to the ISDN standard, other standards may be supplemented which are delayed in nature and operate in a time duplex environment. Further, while the foregoing is provided generally with reference to ADSL technology, one skilled in the art will appreciate that other DSL technologies requiring the mitigation of time duplexed crosstalk effects may also be provided for by the present technique.

The preferred embodiment of the invention uses DMT line coding techniques, which provide multiple sub-channels for the transmission of information. Typically, as an example for ADSL, DMT provides for 256 independent sub-channels for the transmission of information. As known by one skilled in the art, each sub-channel is modulated using Quadrature Amplitude Modulation (QAM) and carries a number of bits per sub-channel. These bits are transmitted and received in groups, or symbols. Generally, 256 complex QAM symbols. which are associated with the 256 independent sub-channels, are then converted using an Inverse Fast Fourier Transform (IFFT) yielding a 512 sample DMT symbol. A cyclic prefix, consisting of 32 samples, is further appended to the 512 samples of each DMT symbol. Briefly stated, the cyclic prefix is a guard space in the frequency domain that is located between neighboring transmit DMT symbols in order to preserve independence between the 256 sub-channels.

Each DMT symbol is made of 544 digital samples (512 samples+32 cyclic prefix samples), which are then converted to an analog signal at a rate of 2.208 MHz for ADSL. This yields a 1.104 MHz wideband signal, wherein each of the 256 sub-channels are spaced by a nominal intercarrier spacing of 4.3125 kHz. With such a sampling rate of 2.208 MHz and a cyclic prefix of 32 samples, the actual duration of the DMT symbol is 246.3768 microseconds.

Since the time duplex period of the interfering noise signal is 2.5 ms ($\frac{1}{400}$ Hz), the period is not a multiple of the above calculated time duration, and therefore, DMT symbols transmitted between the ADSL-CO 60 and the ADSL-CP 62 do not exclusively receive FEXT noise or exclusively receive NEXT noise. The aforementioned is further illustrated and explained with reference to FIG. 4 which is a prior art representation of consecutive periods of a TTR clock, along with NEXT and FEXT crosstalk noise periods, induced by an ISDN system alternating at 400 Hz. It should be noted that FIG. 4 assumes a transmission of information between the ADSL-CO 60 and the ADSL-CP 62.

Figure 4:
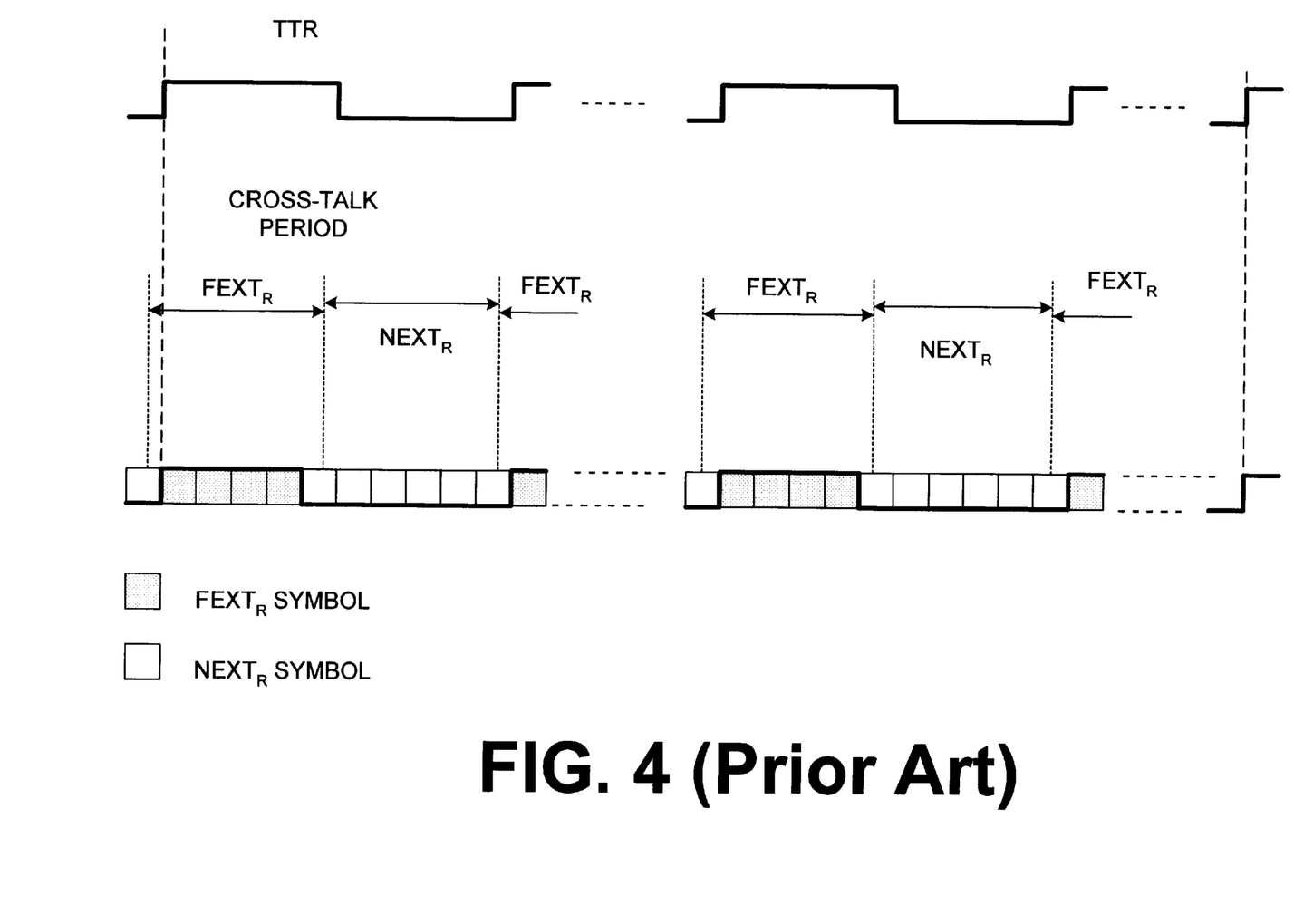
FIG. 4 is a prior art representation of consecutive periods of a TTR clock, which also illustrates NEXT and FEXT crosstalk noise periods, induced by an ISDN system alternating at 400 Hz.

As shown during one TTR period, a number of DSL symbols receive a portion of FEXT noise (designated as FEXTr) and a number of DSL symbols receive a portion of NEXT noise (designated as NEXTr). Unfortunately, since NEXT noise is expected to be more powerful than FEXT noise, when a DSL symbol is partially effected by NEXT noise, standard bitmap profile configurations will transmit the entire DMT symbol at a low bit rate level, instead of at a high bit rate level. As such, although the NEXTr period is equal or shorter in duration than the FEXTr period, there are more NEXT symbols transmitted than FEXT symbols since the effect of NEXT noise causes the entire symbol effected to be transmitted at a low rate. As an example, on average, in a TTR period, where approximately ten DMT symbols are being transmitted, as illustrated by FIG. 4, only four of the ten DMT symbols might be transmitted as FEXT symbols, and therefore, at a higher bit rate, which is not optimal.

In order to provide transmission of a maximum number of DMT symbols at a high rate, a non-trivial swapping of bitmap profiles is necessary. Examples of bitmap profile configurations include single, dual, and trial bitmap profile configurations, which are described in co-pending commonly assigned application entitled, "Alternative Configurations for an ADSL System Operating in a Time Duplex Noise Environment," by Amrany et al., filed on even date herewith, and having Ser. No. 09/457,017, the disclosure of which is incorporated herein by reference.

Single, dual, and trial bitmap profile configurations each seek to optimize the transmission of information by minimizing the effect of NEXT noise as a function of both loop length and bit rate. The following briefly summarizes the three bitmap profile configurations. The single bitmap profile configuration transmits information at a maximum bit rate for the transfer of information at a determined SNR, only when an ADSL receiver is in a FEXT period. The dual bitmap profile configuration transmits information, during the FEXT period, at a maximum FEXT bit rate, and during the NEXT period, at a maximum NEXT bit rate in accordance with a determined SNR. Finally, the trial bitmap profile configuration transmits information at a calculated maximum bit rate during both the FEXT and NEXT periods, wherein the maximum bit rates are based on a composite SNR during the NEXT and FEXT periods. Hence, the standard ADSL system presents a sub-optimal and non-trivial swapping of bit loading profile configurations, in an effort to provide a maximum number of symbols, to be transmitted at a high bit rate.

Addressing the aforementioned shortcomings presented by using a standard DMT symbol length of 246.3768 microseconds, the present ADSL system seeks to maximize the number of DMT symbols transmitted during the FEXTr period portion of each TTR period, thereby increasing the overall bit rate at which information is transferred within an ADSL system. It should be noted that within a TTR period an arbitrary number of DMT symbols may be provided for by the present system. Further, within a TTR period, the whole number of DMT symbols may be divided into 2 sets, possibly of different lengths, one of which is transmitted during the FEXTr period, and the second one of which is transmitted during the NEXTr period.

In accordance with the preferred embodiment of the invention, the ADSL system changes the length of each DMT symbol, thereby providing a system wherein a first half of the DMT symbols are transmitted entirely during the FEXTr period and a second half of the DMT symbols are transmitted entirely during the NEXTr period. This is further illustrated by FIG. 5, which illustrates consecutive periods of the TTR clock after symbols have been modified in accordance with the preferred embodiment of the invention.

Figure 5:
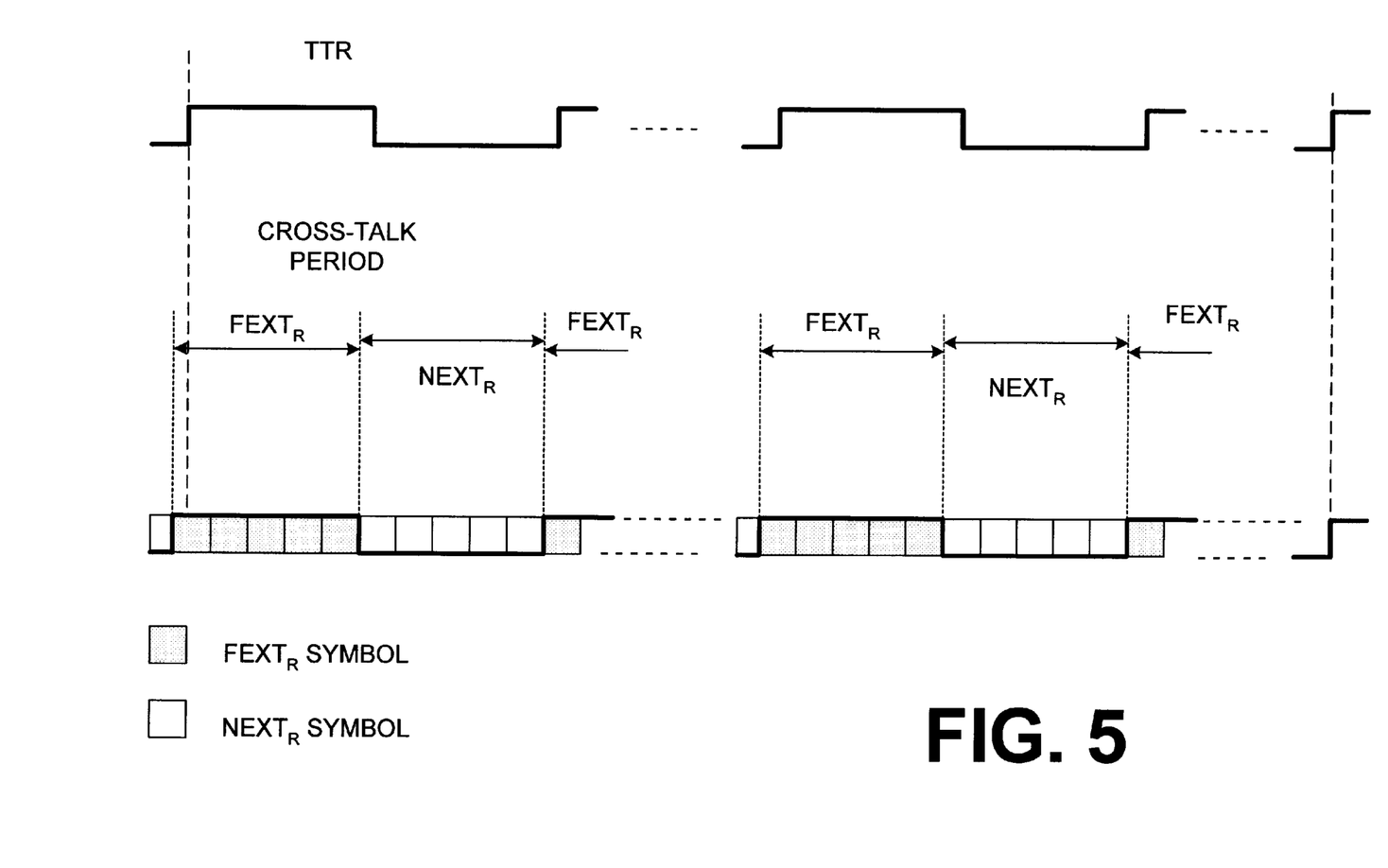
FIG. 5 illustrates consecutive periods of the TTR clock of FIG. 4 after symbols have been modified in accordance with the preferred embodiment of the invention.

As shown by FIG. 5, the duration of each DMT symbol is selected to be 0.25 ms such that exactly ten DMI Isymbols fall within the time duplex period of 2.5 ms. As such, during the FEXTr period, exactly five DMT symbols are transmitted, and during the NEXTr period, exactly five DMT symbols are transmitted. Therefore, in each TTR period, one additional DMT symbol, with modified length, will be transmitted during the FEXTr period, during which information is transmitted at a higher bit rate. As a result of exactly five DMT symbols being transmitted during the FEXTr period, the single and dual bitmap profile configurations transmit additional FEXT DMT symbols, thereby increasing the bit rate of information transmission.

In order to achieve a desired ratio between the DMT symbol length and the time duplex period, each DMT symbol being transmitted may need to be shortened or extended. As previously described in detail hereinabove, there are two parameters that are of particular importance in determining the actual duration of a DMT symbol being transmitted. These two parameters are the number of digital samples per DMT symbol, and the sampling rate at which these digital samples are converted to analog values.

The following demonstrates two possible solutions that exist and which may he used for purposes of adjusting the duration of a DMT symbol. The first solution for adjusting symbol length is to change the number of discrete digital samples per DMT symbol, while maintaining the sampling rate. For a DMT ADSL system with a fixed IFFT transform order, a flexible realization of the first solution is to increase or decrease the size of the cyclic prefix. With the sampling rate and the number of sub-channels being kept at a constant, the intercarrier spacing between sub-channels remains unchanged.

Figure 6:
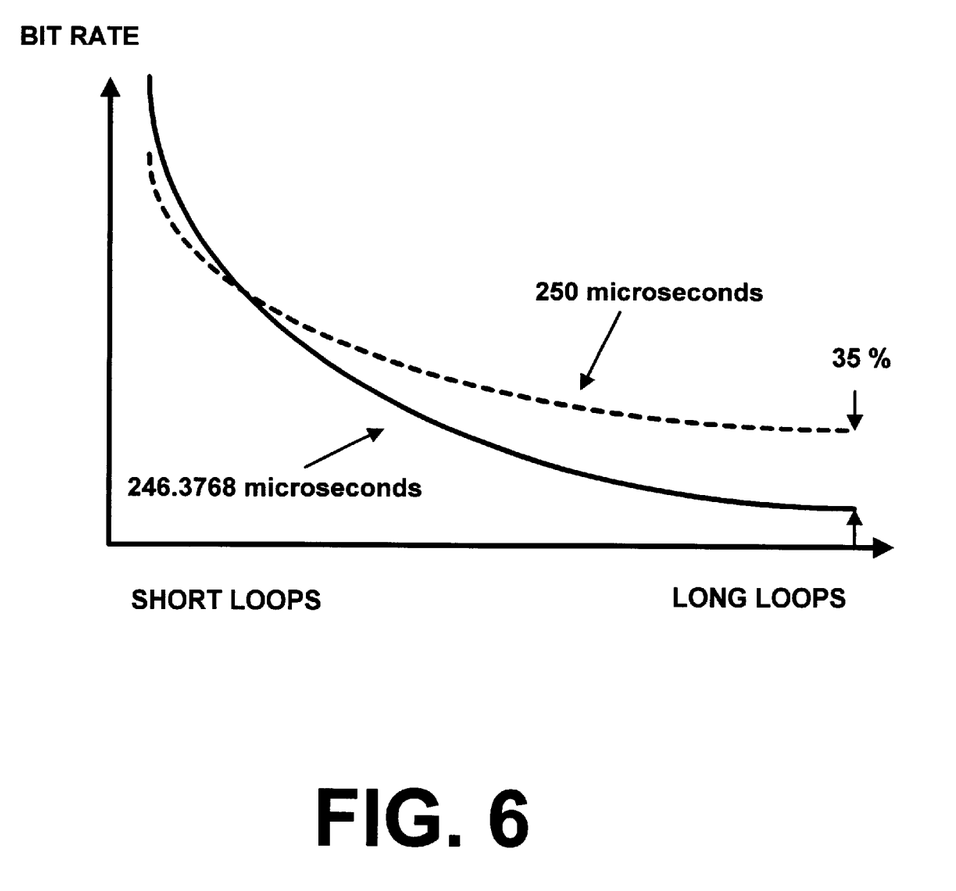
FIG. 6 is a graph which illustrates improvements in bit rate over short and long loops as a result of the preferred embodiment of the invention.

A second possible solution for adjusting symbol length is to keep the number of digital samples per DMT symbol at a constant and vary the sampling rate. While the second possible solution causes the IFFT order and cyclic prefix size to remain unchanged, the variation of the sampling rate will induce a change in the bandwidth of the DMT wideband signal. With an identical number of sub-channels, this translates into a variation of the intercarrier spacing between these sub-channels. FIG. 6 further illustrates the improvement that maximizing the number of DMT symbols transmitted during the FEXTr period presents. In accordance with FIG. 6, the Y axis of the graph plots bit rate, while the X axis plots loop length. As illustrated, an increase of approximately 35 percent in bit rate is acquired by modifying DMT symbol length from the standard of 246.3768 microseconds, to 250 microseconds.

A combination of the two abovementioned solutions may also be used in order to obtain the desired length for DMT symbols. In this case, both the sampling rate parameter and the number of digital samples per DMT symbol parameter can be chosen by design to yield, in combinations the desired DMT symbol duration.

As previously mentioned, in a standard ADSL DMT system with a nominal sampling rate of 2.208 MHz, an IFFT order of 256, and a cyclic prefix of 32 samples, the actual duration of the DMT symbol is 246.3768 microseconds. In accordance with the preferred embodiment of the invention, to yield a DMT symbol length of exactly 250 microseconds, application of the first solution described above requires the extension of the cyclic prefix size from 32 samples to 40 samples. A total of 552 digital samples per DMT symbol (512 from IFFT transform+40 from cyclic prefix) are then converted to analog values at an unchanged sampling rate of 2.208 MHz to yield a DMT symbol length of 250 microseconds. The default intercarrier spacing remains 4.3125 kHz.

Application of the second abovementioned solution to the preferred embodiment of the invention, requires modification of the sampling rate at which the constant 544 digital samples (512 samples form IFFT transform+32 samples) of each symbol are converted to analog values at the sampling rate of 2.176 MHz. In order to maintain 256 sub-channels, the intercarrier spacing is reduced to 4.25 kHz. As a result of the aforementioned, DMT symbol length is 250 microseconds.

In accordance with an alternative embodiment of the invention, an ADSL system is provided which is capable of reconfiguring after negotiation between the ADSL-CO transceiver 60 and the ADSL-CP transceiver 62. Reconfiguration allows the ADSL system to adopt a default operational mode based upon, either, a standard sampling rate and a nominal number of digital samples per DMT symbol, or the operational mode of the preferred embodiment based upon a modified sampling rate and/or a modified number of digital samples per DMT symbol, chosen to adjust the actual size of the DMT symbol. It should be noted that the foregoing can be applied to any xDSL transceiver, and is not limited solely to ADSL technology.

Selection of the mode of operation according to the standard operational mode, or to the operational mode of the preferred embodiment, can be performed in a handshake phase, prior to an actual training phase of the transceivers. The actual configuration of the transceivers, according to the selected mode of operation, is effective when entering the training phase, after parameters of the configuration, such as sampling rate and cyclic prefix size, have been selected in the handshake phase.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments(s) of the invention without departing substantially from the spirit and principles of the invention. All such modifications and variations are intended to be included herein within the scope of the present invention and protected by the following claims.

The following is claimed:

1. A system for modifying symbol duration in a time duplex noise environment, wherein a total number of Discrete MultiTone (DMT) symbols are transmitted within a Time compressed Multiplex Integrated Service Digital Network timing reference (TTR) period, comprising:
   a first transceiver; and
   a second transceiver, wherein said first transceiver transmits a first half of said total number of DMT symbols to said second transceiver while said first transceiver receives far end crosstalk noise, and said first transceiver transmits a second half of said total number of DMT symbols to said second transceiver while said first transceiver receives near end crosstalk noise.

2. The system of claim 1, wherein said system is an xDSL system.

3. The system of claim 2, wherein said xDSL system uses Discrete Multi-Tone (DMT) line coding.

4. The system of claim 1, wherein each of said DMT symbols is adjusted to be 0.25 ms in duration.

5. The system of claim 1, wherein each of said DMT symbols is adjusted to be 0.25 ms in duration such that a total of ten DMT symbols fall within a time duplex period of 2.5 ms.

6. The system of claim 4, wherein adjusting said DMT symbols is performed by changing a number of discrete digital samples per DMT symbol while maintaining a sampling rate.

7. The system of claim 6, wherein each of said adjusted DMT symbols contains 40 cyclic samples.

8. The system of claim 1, wherein each of said DMT symbols is further defined by 512 samples, and a cyclic prefix having 32 samples.

9. The system of claim 1, wherein said time duplex noise environment is an integrated services digital network (ISDN) time duplex noise environment.

10. The system of claim 9, wherein said total number of DMT symbols is further defined by a total of 10 consecutive DMT symbols which are fitted into a period of said ISDN environment, wherein said ISDN environment alternates at 400 Hz.

11. The system of claim 1, wherein said duration of each of said DMT symbols is modified by modifying a DMT sampling rate, and not extending a cyclic prefix.

12. The system of claim 1, wherein said duration of said DMT symbols is modified by extending a cyclic prefix size of each of said DMT symbols.

13. The system of claim 1, wherein said duration of said DMT symbols is modified by modifying a DMT sampling rate and extending a cyclic prefix size of each of said DMT symbols.

14. A method of modifying symbol duration in a time duplex noise environment so as to transmit a total number of Discrete MultiTone (DMT) symbols within a Time Compressed Multiplex Integrated Service Digital Network timing reference (TTR) period, comprising the steps of:
   transmitting a first half of said total number of DMT symbols during a far end crosstalk period; and
   transmitting a second half of said total number of DMT symbols during a near end crosstalk period.

15. The method of claim 14, further comprising the step of extending a cyclic prefix size of each of said DMT symbols such that each of said DMT symbols contains 40 cyclic samples.

16. The method of claim 14, wherein said symbol duration is 250 microseconds.

17. The method of claim 14, further comprising the step of modifying a DMT sampling rate and not extending a cyclic prefix, such that each of said DMT symbols is adjusted to be 0.25 ms in duration.

18. A system for modifying symbol duration in a time duplex noise environment, wherein a total number of Discrete MultiTone (DMT) symbols are transmitted within a Time Compressed Multiplex Integrated Service Digital Network timing reference (TTR) period, comprising:
   a first transceiving means; and
   a second transceiving means, wherein said first transceiving means transmits a first half of said total number of DMT symbols to said second transceiving means while said first transceiving means receives far end crosstalk noise, and said first transceiving means transmits a second half of said total number of DMT symbols to said second transceiving means while said first transceiving means receives near end crosstalk noise.

19. The system of claim 18, wherein said system is an xDSL system.

20. The system of claim 19, wherein said xDSL, system uses Discrete Multi-Tone Tone(DMT) line coding.

\* \* \* \* \*